United States Patent [19]
Dolan et al.

[11] Patent Number: 5,701,579
[45] Date of Patent: Dec. 23, 1997

[54] MODULAR ANTENNA DRIVER INCLUDING REMOVABLE MODULES EACH CHARACTERISTIC OF A HANDSET TYPE

[75] Inventors: John M. Dolan, Woodbury, N.Y.; Andrew S. Beasley, Lake Errock, Canada

[73] Assignee: PCS Solutions, LLC, Englewood Cliffs, N.J.

[21] Appl. No.: 158,256

[22] Filed: Nov. 29, 1993

[51] Int. Cl.$^6$ ........................................................ H04Q 7/30
[52] U.S. Cl. .................. 455/3.1; 455/6.3; 455/56.1; 455/282; 379/61
[58] Field of Search .................. 348/6, 10–12; 455/282, 3.1, 4.1, 4.2, 5.1, 6.1, 6.2, 6.3, 7, 14, 33.1, 33.3, 53.1, 54.1, 56.1; 379/61, 58, 59

[56] References Cited

U.S. PATENT DOCUMENTS

| | | | |
|---|---|---|---|
| 4,153,937 | 5/1979 | Poland | 364/706 |
| 4,295,181 | 10/1981 | Chang et al. | 361/395 |
| 4,694,484 | 9/1987 | Atkinson et al. | 379/59 |
| 5,138,649 | 8/1992 | Krisbergh et al. | 455/344 X |
| 5,194,947 | 3/1993 | Lowcock et al. | 348/6 |
| 5,335,276 | 8/1994 | Thompson et al. | 379/58 X |
| 5,381,459 | 1/1995 | Lappington | 455/53.1 X |
| 5,432,838 | 7/1995 | Purchase et al. | 455/55.1 X |

FOREIGN PATENT DOCUMENTS

| | | |
|---|---|---|
| 2059370 | 1/1992 | Canada . |
| 0 421 602 A2 | 4/1991 | European Pat. Off. . |
| 2 253 770 A | 9/1992 | European Pat. Off. . |
| WO 92/13400 | 8/1992 | WIPO . |

OTHER PUBLICATIONS

Brochure on the 700 series Flexnet™ Line Extenders of C–C Core Electronics, Inc.
Letter dated to Mr. Roger Hay of Cable Television from Dr. Andrew Beasley enclosing document entitled "Development of CATV–Microcell Interconnect Technology", pp. 1–4.
Time Warner overhead handouts, "4) Comments on Time Warner Point of Entry Concept", p. 5.
FCC filing by Cablevision System Corp. and PCS Microcell Int'l, Inc. entitled "Continuing Investigation of the RF Link," dated Nov. 30, 1992, pp. 29–35, Exhibits 8–11.

*Primary Examiner*—Reinhard J. Eisenzopf
*Assistant Examiner*—Philip J. Sobutka
*Attorney, Agent, or Firm*—Schwegman, Lundberg, Woessner & Kluth, P.A.

[57] ABSTRACT

A modular antenna driver is provided for extending the area of coverage between a base station connected to a CATV cable system and a plurality of cordless handsets. The driver includes a duplex circuit connected to the CATV cable and tuned for upstream and downstream communications with the base station over the cable. A core circuit connected to the duplex circuit includes circuitry interconnected to perform and of sufficient bandwidth to perform communication functions common to at least two different handset types. At least one removable module is selectively insertable into the driver and includes circuitry interconnected to perform communication functions characteristic of one handset type wherein one such module will may be replaced by a second module for a different second handset type. In the alternative, multiple removable modules may be simultaneously employed in the driver to permit simultaneous compatibility with a plurality of handset types.

11 Claims, 8 Drawing Sheets

MODULAR ANTENNA DRIVER INCLUDING REMOVABLE MODULES EACH CHARACTERISTIC OF A HANDSET TYPE

BACKGROUND OF THE INVENTION

1. Field of the Invention

The present invention relates to an antenna driver which may be utilized to extend the area of coverage between a base station connected to a signal conduit system, such as a CATV cable network, and a plurality of cordless handsets.

2. Description of the Prior Art

Personal communication systems (PCS) comprise a plurality of cordless handsets or telephones which communicate through base stations to a larger network such as the Public Switched Telephone Network (PSTN) or Private Automatic Branch Exchange (PABX). One known method of extending the area of coverage between such a base station and a plurality of cordless handsets is to employ a number of geographically dispersed antenna drivers which in effect extend the virtual area of coverage of the base stations. The base stations and the antenna drivers are interconnected in such a system by a signal conduit system. The signal conduit system may comprise, for example, a fiber system, a microwave link, a coaxial network, a cable TV (CATV) distribution system, or a combination of one or more of these transmission medium. Preestablished signal conduit systems, such as CATV distribution systems, are preferred.

The antenna driver in such a prior art system is employed to transmit and receive carrier signals to and from the base station through the signal conduit, and the antenna drivers transmit and receive voice signals to or from the cordless handsets. However, the existing antenna drivers have a problem in that they can support only one cordless handset type. There are today in existence a multiplicity of handset types which employ different center frequencies, modulation techniques, and bandwidth. Thus a different antenna driver is required for each different frequency and/or modulation scheme. Accordingly, when a different handset is to be employed in a particular geographic area, the antenna drivers already in place are required to be exchanged for new antenna drivers compatible with the new handset types. Furthermore, when a different handset type is to be supported, a new handset driver may be required to be installed in place of the old driver. This is a costly, ineffective way of supporting different types of cordless handsets.

This problem is further enhanced by a lack of standard protocol for the handsets in the industry which means that manufacturers will produce different types of handsets using different specifications. One way to solve this problem is to limit each system to use only one specific handset type, i.e., the system is "stuck" with the preliminary handset type of choice. However, it is an objective of the present invention to solve this problem and to provide a handset driver which has the capacity of supporting different types of handsets simultaneously and the flexibility of switching from one handset type to another without requiring an entirely new antenna driver.

SUMMARY OF THE INVENTION

To achieve these and other advantages, and in accordance with the purpose of the invention, as embodied and broadly described, a modular antenna driver is provided for extending the area of coverage between a base station connected to a signal conduit system and a plurality of cordless handsets, which comprises a duplex circuit connectable to the signal conduit and including a circuit tuned for downstream and upstream communication with the base station over the signal conduit. A core circuit is connected to the duplex circuit and includes circuitry interconnected to perform and of sufficient bandwidth to perform communication functions common to at least two different handset types. The driver further includes at least one removable module selectively inserted into the driver. This module includes circuitry interconnected to perform communication functions characteristic of one handset type, wherein this first module may be replaced by a second module for a different, second handset type. Contacts connected to the core circuit are adaptable to removably receive either the first or second of the modules.

In an alternative and improved embodiment there are provided additional contacts connected to the core circuit and adaptable to receive an additional one of the modules, and the driver includes at least one additional removable module selectively insertable into the driver simultaneously with the first module, the second module including circuitry interconnected to perform communication functions characteristic of a second handset type.

Preferably the duplex circuit comprises a diplexing filter tuned to pass downstream and upstream communications signals of sufficient bandwidth to accommodate both the first and second handset types. It is also preferable that the core circuit includes a filter turned to pass instruction data received from the signal conduit and a computer, such as a microprocessor, with software programmed to control the inserted module(s) in response to the instruction data. Ideally, the computer includes software to control a plurality of different handset types and instruction data is provided which includes data to select the software for the handset type modules inserted into the driver.

The modules themselves preferably include a frequency translator circuit corresponding to the handset type for that module. A single antenna and a corresponding circuit may be employed to selectively couple the output from each of a plurality of modules to that antenna. In the alternative, each module may include its own antenna and related connections.

BRIEF DESCRIPTION OF THE DRAWINGS

The accompanying drawings are included to provide a further understanding of the invention and are incorporated in and constitute a part of this specification, illustrate one embodiment of the invention, and together with the description, serve to explain the principles of the invention.

DESCRIPTION OF PREFERRED EMBODIMENT

Reference will now be made in detail to the present preferred embodiment of the invention, an example of which is illustrated in the accompanying drawings.

Antenna drivers are known for extending the area of coverage between a base station connected to a signal conduit system, such as a CATV system, and a plurality of cordless handsets. As noted above, an object of the present invention is to provide a modular antenna driver which is readily adaptable to at least two different handset types. In one embodiment, the adaptation is sequential, that is to say only one handset type is available for utilization at any given time, although the conversion from one to the other type is easily accomplished through the utilization of a modular construction. In the second configuration, the utilization of two different handset types is simultaneous, that is to say the modularity configuration of the antenna driver permits a multiplicity of handset types to be utilized at the same time.

Figure 1:
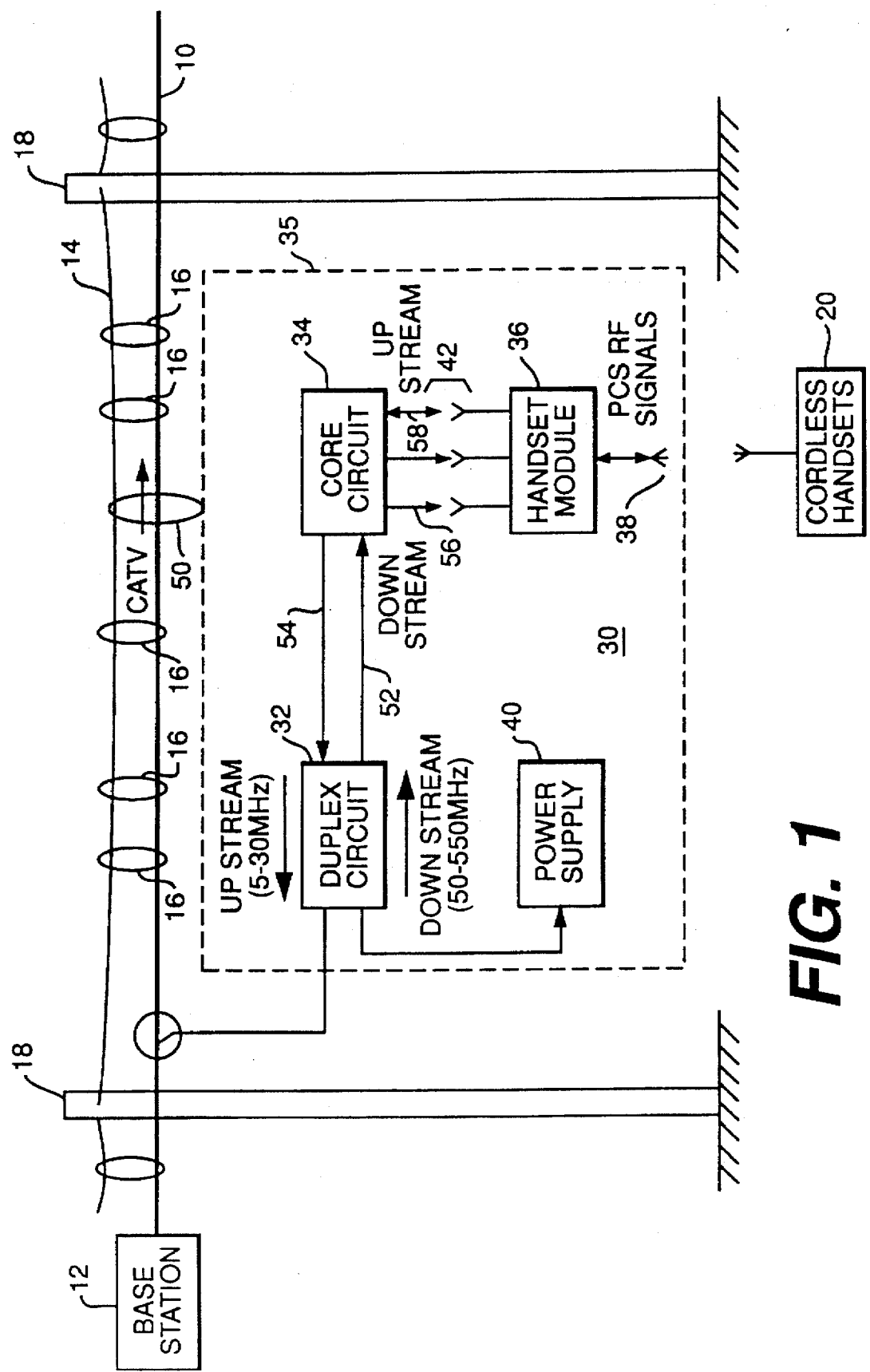
FIG. 1 is a block diagram of a modular antenna driver incorporating the teachings of the present invention.

An exemplary embodiment of a modular driver incorporating the teachings of the present invention is illustrated in FIG. 1. As shown in FIG. 1, there is provided a signal conduit system represented by CATV cable 10 which is coupled to a base station 12 using conventional technology well known to those skilled in the art. Cable 10 is shown supported from strand 14 by a plurality of insulating ties 16. Strand 14, in turn, is suspended between telephone poles 18 as is well known to those skilled in the art.

As is also known to those skilled in the art, a plurality of antenna drivers may be coupled to CATV cable 10 in order to effectively extend the area of coverage between base station 12 and a plurality of cordless handsets 20. In such prior art antenna drivers, a duplex circuit is connectable to the CATV cable and includes a circuit tuned for downstream and upstream communications. Additional circuitry is coupled to the duplex circuit comprising a plurality of components interconnected to perform communication functions common to a single handset type. Accordingly, in the prior art, each antenna driver was uniquely identifiable with a corresponding handset type and meaningful alteration of the componentry incorporated in such a prior art driver was required in order to convert utilization of such a antenna driver from one handset type to a different second handset type.

In accordance with the present invention, there is provided a modular antenna driver. As illustratively shown in FIG. 1, there is provided a modular antenna driver 30 comprising a duplex circuit 32, a core circuit 34, a handset module 36, an antenna system 38, a power supply 40 and selectively engageable contact set 42.

Duplex circuit 32, as in the prior art, is connectable to cable 10 and includes a circuit tuned for downstream and upstream communications with base station 12 over cable 10. Duplex circuit 32 may, for example, comprise a diplexing filter tuned to pass downstream and upstream communication signals. In the case of a CATV cable signal conduit system, downstream signals may typically be located in the 50 to 550 MHz range and upstream signals may typically be located in the 5–30 MHz range. It is important for the present invention that the bandwidth of duplex circuit 32 be sufficiently wide in order to accommodate upstream and downstream communications for at least two different handset types 20.

The interconnection of duplex circuit 32 to cable 10 may be accomplished through a standard tap which is not a subject to the present invention. This tap may occur near the location of a telephone pole 18 and the resultant antenna driver 30 may in that instance be pole mounted in a conventional manner. In the alternative, the tap may be accomplished some distance from telephone pole 18. For either tap location, the driver 30 may be strand mounted directly from strand 14 by means of a bracket 50. In this instance, the whole of driver 30, except for the antenna, should be assembled in a single case 35. Preferably in this instance, antenna driver 30 is located at least 24 inches away from any telephone pole 18 to thereby preclude telephone pole 18 from interfering with the radiation pattern of driver 30. By having the option of either strand mounting or pole mounting driver 30, a larger number of sites are available, thus increasing the effective area of coverage.

The duplex circuit 32 comprises a downstream signal path over conductor 52 to core circuit 34 and an upstream signal path over conductor 54 from core circuit 34 to duplex circuit 32. While blocking AC power to conductors 52 and 54, the duplex circuit passes AC power from cable 10 to power supply 40. Power supply 40 powers the antenna driver through the AC power received from cable 10.

As will be described in more detail below, core circuit 34 is connected to duplex circuit 32 by conductors 52 and 54. Core circuit 34 includes circuitry interconnected to perform communication functions common to at least two different handset types. For example, core circuit 34 provides signal processing and control functions such as filtering and demodulation of the carrier signal to retrieve instruction data (which is sometimes referred as "engineering control data") and a frequency reference. The instruction data may include timing and control signals including transmit and receive timing (for time division duplex handsets, for example), squelch set points, operating center frequencies for the upstream and downstream communication paths over cable 10, and the center frequency of various handset types 20. Each of the signal processing and filtering functions of core circuit 34 is of sufficient bandwidth to perform communication functions for at least two different handset types.

In the context of this document, "handset type" indicates the multiplicity of handsets that can share a common base station by virtue of similar fundamental parameters such as operating protocol, access scheme, center frequency of operation etc.

In the context of this document, "different handset types" indicates two or more handsets that differ in a fundamental parameter (e.g., operating protocol, center frequency of operation, multiple access scheme), such that the handsets are not interoperable into a common base station.

The downstream signal from duplex circuit 52 passes through core circuit 34 to handset module 36 over conductor 56. An upstream signal path passes from handset module 36 to core circuit 34 over conductor 58. Handset module 36 is removable from and selectively insertable into driver 30. Module 36 includes circuitry interconnected to perform communication functions characteristic of one handset type. With this relationship, module 36 may be replaced by a second module for a different, second handset type. As will be discussed in more detailed below, handset module 36 processes the downstream carrier signal to permit transmission of PCS RF signals at antenna 38 in a format compatible with a chosen first handset type 20. This compatibility includes compatibility of frequency of utilization and compatibility of modulation technique and protocol. For example, a CT-2 handset type uses the frequency range 866–868 MHz whereas other handset types, such as Motorola and Qual Com use the frequency range of 1850 MHz–2.2 GHz. Core circuit 34, to be compatible with both these different handset types, must have a frequency range which allows both 866–868 MHz and 1850 MHz–2.2 GHz operation.

The insertability of handset module 36 into driver 30 is accomplished by utilization of a plurality of contacts in the form of contact set 42. Accordingly, unlike the prior art where significant component replacement and reorganization was required to convert an antenna driver from utilization with one handset to a second handset, in accordance with the present invention, all that is required is the simple replacement of a removable handset module.

The core functionality of the modular antenna driver 30 remains commonly available for all handset modules. This core functionality includes mechanical packaging, power supplies, such as power supply 40, CATV interfacing, CATV command and control signals, and CATV supplied frequency reference. It should be understood that while FIG. 1 shows duplex and power supply functions explicitly, they can form a subset of the core circuit. Those functions uniquely characteristic of a particular handset type, on the other hand, are incorporated into removable handset module 36. Such functions include the characteristics of center frequency, the characteristics of frequency translation unique to a particular handset type (e.g., filter bandwidths), the characteristics of modulation unique to a particular handset type, (e.g., time division duplex switch timing), transmit power levels, and antenna diversity capability.

Figure 2:
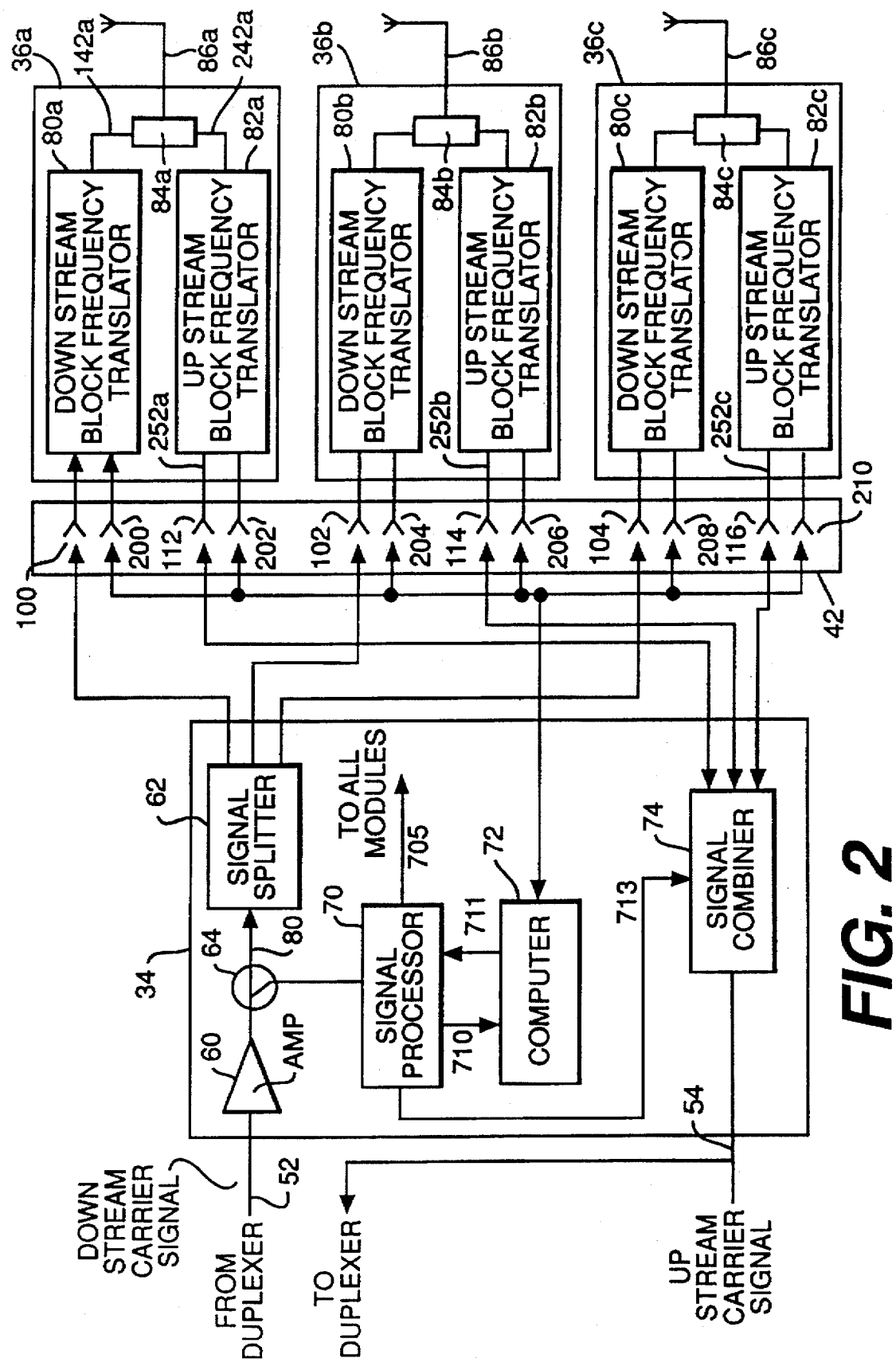
FIG. 2 is a more detailed diagram of the modular antenna driver shown in FIG. 1.

In FIG. 2 there is illustrated a more detailed diagram of a preferred embodiment of core circuit 34. As shown in FIG. 2, core circuit 34 may comprise amplifier 60, signal splitter 62, coupler 64, signal processor 70, computer 72 and signal combiner 74. A downstream carrier signal is supplied over conductor 52 to the input of amplifier 60. The bandwidth of amplifier 60 is selected so as to accommodate communication functions common to at least two different handset types. By providing this common functionality, different handset modules 36 may be utilized without the need to replace core circuit components such as amplifier 60.

Figure 3:
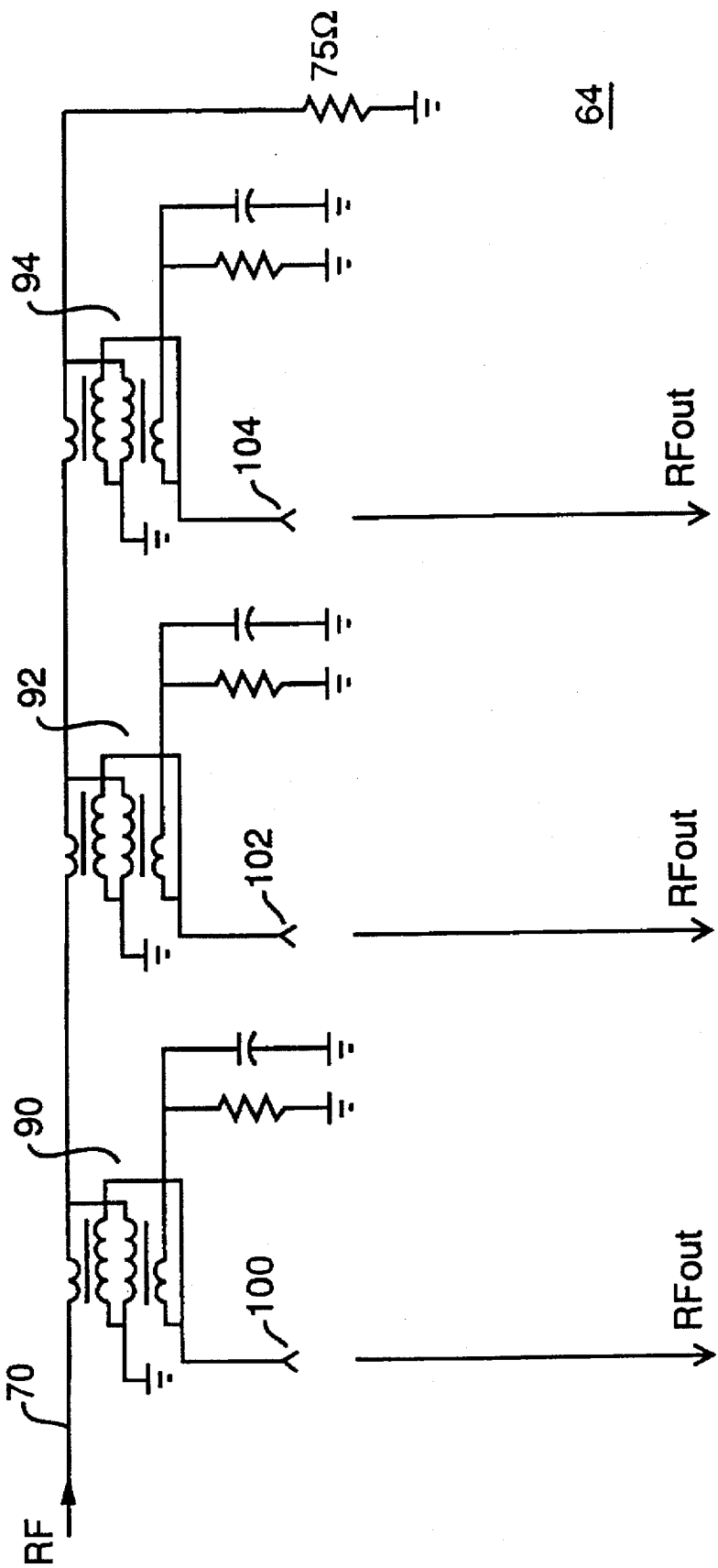
FIG. 3 is a schematic diagram of the signal splitter illustrated in FIG. 2.

The output of amplifier 60 passes over conductor 80 to signal splitter 62. A preferred embodiment of signal splitter 62 is illustrated in FIG. 3 as comprising a plurality of couplers 90, 92 and 94. Each of couplers 90, 92 and 94 provides a coupling between conductor 70 and a plurality of respective output contacts 100, 102 and 104. Couplers 90, 92 and 94 are conventional transformer wound directional couplers and provide the desired attributes of broad bandwidth and low loss, and can easily support a multiple number of outputs without undue attenuation or interference. In a preferred embodiment of the invention in which only a single removable module may be utilized at a time, only a single coupler 90 and corresponding connector 100 would be required. However, in the preferred embodiment in which a plurality of modules may be simultaneously utilized, it is necessary to employ a plurality of couplers and a plurality of corresponding connectors. Connectors 100, 102 and 104 are also illustrated in FIG. 2 as component elements of contact set 42.

Returning to core circuit 34 illustrated in FIG. 2, coupler 64 extracts a sample of the downstream carrier signal which is subsequently passed to signal processor 70 and onto computer 72.

Figure 8:
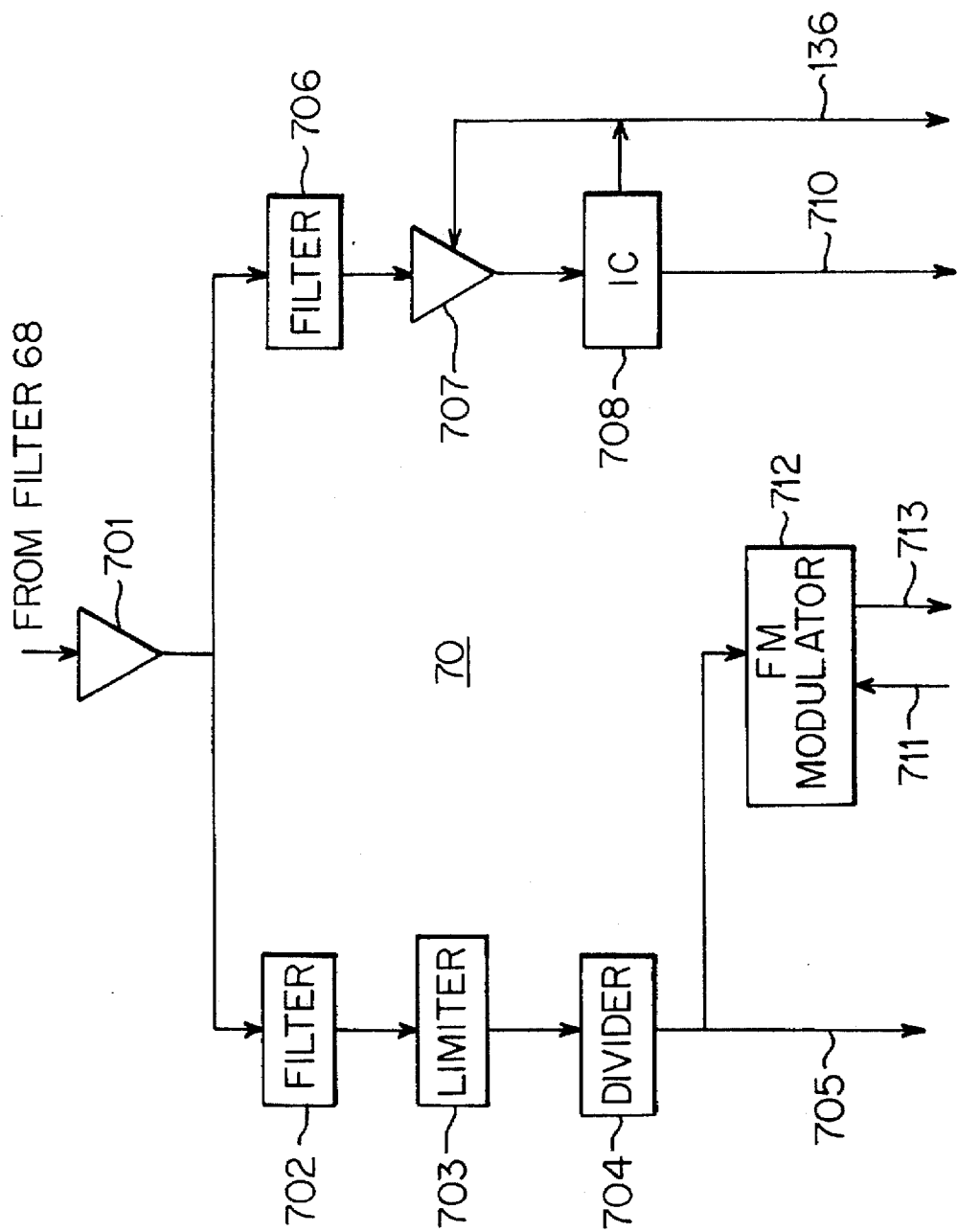
FIG. 8 is a schematic diagram of the signal processor illustrated in FIG. 2.

An illustrative example of signal processor 70 is shown in FIG. 8. Referring to FIG. 8, the input signal from filter 68 is buffered by an amplifier 701, and the output signal from the amplifier 701 is split into two paths.

One path leads to a narrowband crystal filter 702. The pass band of the filter 702 is selected to be at the reference frequency of the CATV system (most commonly 73.9 MHz). This reference frequency is commonly injected onto the CATV system at a central site and is available to all downstream units. The output of the filter 702 is then hard limited by limiter 703. The output of limiter 703 is then typically processed by a common integrated circuit called a divider 704 to provide the reference frequency for use internal to the antenna driver on conductor 705. A typical example of the divider 704 would be the Motorola part MC12022. The internal reference frequency on conductor 705 is used by all synthesizers that are in the antenna driver and so controls the frequency conversion processes. For clarity, the interconnect through contact set 42 of the frequency reference conductor 705 to all synthesizers in all block translators is not shown in FIG. 2.

The second path from the output of the amplifier 701 leads to a narrowband filter 706. The narrowband filter 706 is tuned to an engineering control channel, which contains the instruction data, on the CATV system. This instruction data is used by the antenna drivers of the system to receive data and timing from a central site on a carrier which is frequency modulated (FM) at a low data rate. The output from the filter 706 passes through a gain controlled amplifier 707 and into a common integrated circuit 708 capable of providing FM demodulation and a signal to provide for automatic gain control. An example of integrated circuit 708 is the Motorola part MC3356. The demodulated data is placed on conductor 710, and the signal for gain control is made available from conductor 136 (FIG. 5) to control the gain of amplifier 707. Accordingly, the integrated circuit 708 operates with a constant input level, irrespective of the prior losses or gains of the signal amplitudes associated with the Cable TV system. Conductor 136 is also used to control the gain of the amplifiers in the modules to provide constant levels also independent of the prior CATV system (see FIG. 5). For clarity, the interconnect 136, to all modules of FIG. 2 is not shown.

By placing the gain control functions in the core circuit in this fashion, it is not necessary for the modules to have individual pilot carriers for gain control, resulting in a more efficient use of the spectrum on the CATV system. Similarly, by having a single carrier on which the instruction data for all of the modules is modulated, a more efficient system is obtained than one with a "carrier-per-module". Further efficiency is obtained by using FM modulation since this allows the carrier for the instruction (or engineering control) data to be the same carrier as used for gain control. For example, the use of Amplitude Modulation (AM) of the instruction data onto a carrier would preclude the carrier from being able to provide gain control capability since AM modulation is amplitude dependent.

In order to realize these efficiencies, the frequency of the instruction data carrier should be reasonably close to the downstream frequency of the Cable TV system used to transport the signals to be transmitted to handsets 20 (PCS signals). This is because signals at different carrier frequencies from each other result in different gains and losses on the CATV system, and this effect becomes greater as the carrier frequencies are farther apart. For example, downstream PCS signals in the band 450–480 MHz would typically require selection of the instruction data carrier frequency in the band 400–450 MHz to ensure that the carrier sees the same gains and losses on the CATV system, as the PCS signals.

Also shown in FIG. 8 is conductor 711 which carries status monitoring data from the computer 72 to an FM modulator 712. This modulator 712 will conventionally require the frequency reference on conductor 705 to operate. The output from FM modulator 712 is available on conductor 713 and is injected into the upstream path at the signal combiner 74 (see also FIG. 4).

The computer 72 typically is a microprocessor with software and hardware to provide various functions for the antenna driver. The computer 72 receives data from the signal processor 70 through conductor 710 and provides the correct module timing for mute, squelch, and switching functions. The need for these functions is most apparent when the module supports a Time Division Duplex (TDD) handset type. The computer 72 receives data from signal processor 70 through conductor 710 to set the module to the correct power levels and synthesizer frequencies, and to switch a module to the correct state for any antenna diversity that may be required by some handset types. The computer 72 receives data from signal processor 70 through conductor 710 to reconfigure the modules and antenna driver to support any testing that may be required.

The computer 72 receives status monitoring data from all modules and from all elements of the antenna driver and passes that data over conductor 711 to the signal processor 70. This allows a central site to check whether the antenna driver is operating correctly. The computer 72 samples the IF available on module conductors 246 in FIG. 6, and determines whether the power levels are commensurate with the presence of a PCS signal. If the computer 72 determines that the PCS signals are absent, then the computer may deliberately block the passage of the output of the IF amplifier 232 to conductor 252 by sending an appropriate control signal to the CATV frequency converter 236. This will reduce the injection of unnecessary noise into the upstream path. If a PCS signal is present, then the blocking is removed. For certain module types (e.g., modules to support a single TDMA carrier), the computer also uses the sampled signals from IF through module conductors 246 in FIG. 6 to control the gain of the amplifier 248 so as to inject a constant level into the upstream path.

Figure 4:
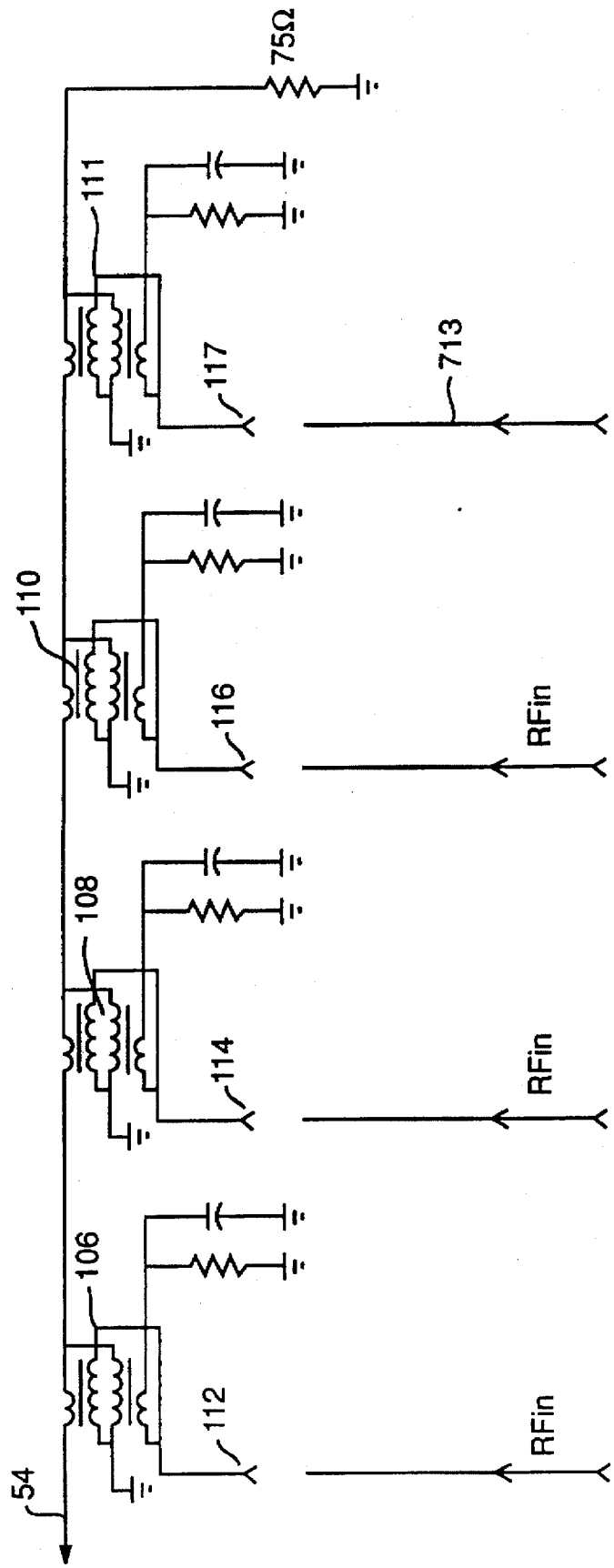
FIG. 4 is a schematic diagram of the signal combiner illustrated in FIG. 2.

An illustrative example of signal combiner 74 is shown in FIG. 4 as comprising a plurality of couplers 106, 108 and 110 each of which provide conventional coupling between a corresponding connector 112, 114 and 116, and conductor 54 which is connected to duplex circuit 32. Couplers 106, 108 and 110 may be conventional transformer wound directional couplers which, as noted above, provide desired bandwidth, low loss and easily support a plurality of connectors 112, 114 and 116. If the embodiment of the invention employing a single replaceable handset module is employed, only a single coupler 106 and corresponding connector 112 is required along with coupler 111 to support status monitoring. However, for the embodiment of the present invention which simultaneously employees a plurality of handset modules, a plurality of couplers 106, 108, 110 is required with corresponding connectors 112, 114 and 116. FIG. 4 also shows a coupler 111 which provides conventional coupling between a connector 117 which receives the output of the FM modulator 712 through conductor 713 from the signal processor 70. Connectors 112, 114, 116 and 117 are shown in FIG. 2 as comprising elements in contact set 42.

As is also shown in FIG. 2, the interconnection between computer 72 and any one of a plurality of handset modules 36a, 36b, 36c is accomplished through the utilization of additional contacts 200, 202, 204, 206 and 208 in contact set 42. Accordingly, contact set 42 includes a plurality of contacts 100, 102, 104, 112, 114, 116, 200, 202, 204, 206, 208 and 210, which are adapted to removably receive a corresponding one of modules 36a, 36b and 36c either sequentially in the case of the first embodiment or simultaneously in the case of the second embodiment.

As is further illustrated in FIG. 2, each of handset modules 36a, 36b and 36c comprises a downstream block frequency translator 80a, 80b, 80c, an upstream block translator 82a, 82b and 82c, a switch or duplexer circuit 84a, 84b and 84c and a corresponding antenna 86a, 86b and 86c. As will be explained in more detail below, each downstream block frequency translator 80a, 80b, 80c is uniquely configured to perform communication functions characteristic of a particular corresponding handset type. The upstream frequency translators 82a, 82b and 82c for each handset module are configured to perform communication functions characteristic of the corresponding handset type for that module. Accordingly, in a transmission mode, signals from a downstream block frequency translator 80a, 80b, 80c for a particular handset type are connected through elements 84a, 84b, 84c to corresponding antenna 86a, 86b, 86c and signals received at the corresponding antennas 86a, 86b and 86c are communicated through the corresponding elements 84a, 84b and 84c to the corresponding upstream block frequency translator 82a, 82b, 82c.

With the utilization of three handset modules, with each module configured to perform communication functions characteristic of a different handset type, the simultaneous utilization of three different handset types may be performed by a single modular antenna driver. Each of these modules may be replaced by a different module in the event a new or different handset type or combination of handset types is required or in the event that a particular handset type is updated requiring a corresponding updating in the antenna driver.

Figure 5:
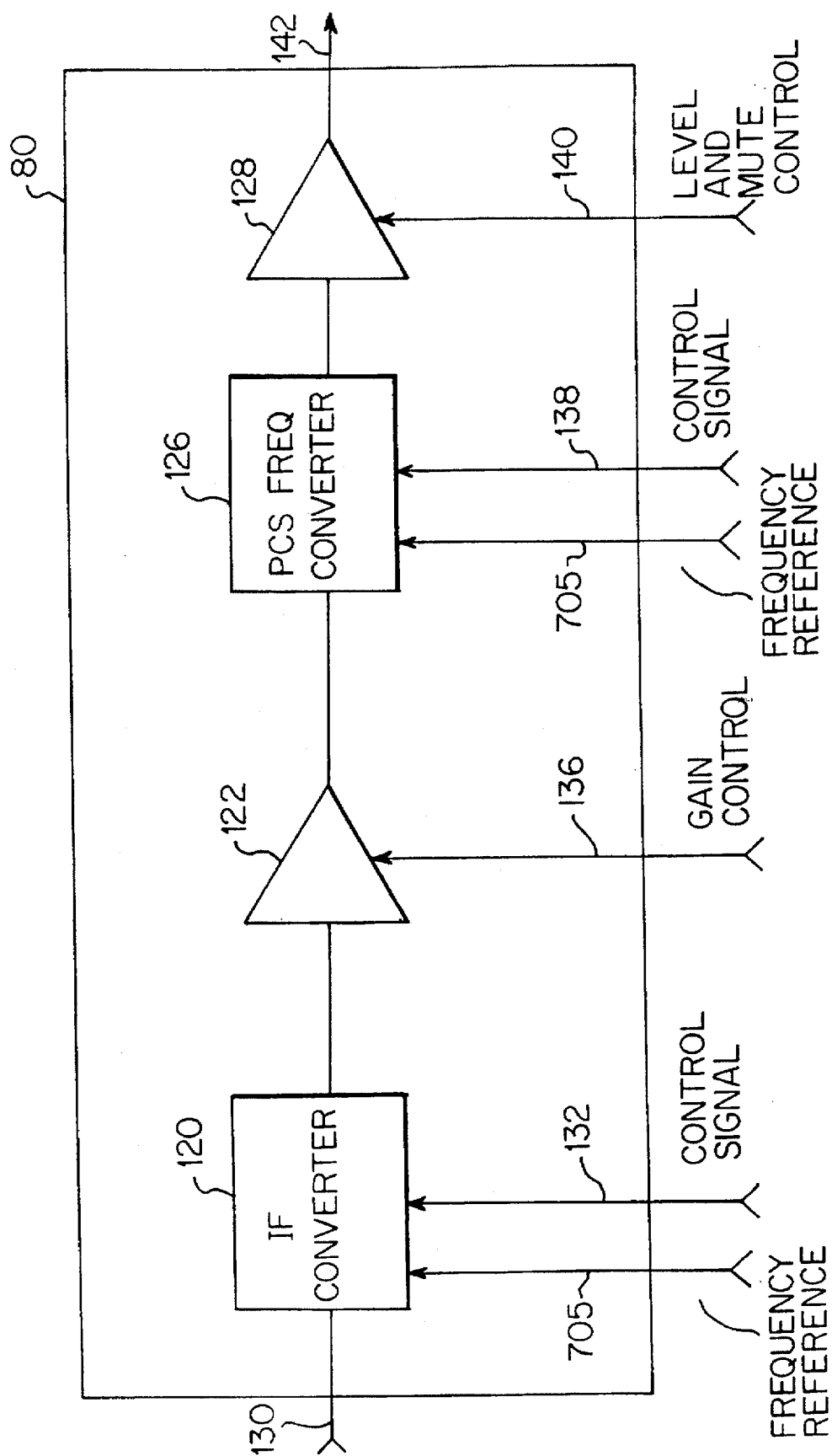
FIG. 5 is a block diagram of a downstream block frequency translator of FIG. 2.

A preferred embodiment of a downstream block frequency translator 80 is illustrated in FIG. 5 as comprising a bandlimiting intermediate frequency (IF) converter 120, an IF amplifier 122, a PCS frequency converter 126, and an output amplifier 128. A downstream carrier signal from signal splitter 62 is provided over conductor 130 to the input of downstream block frequency translator 80 and, particularly, to the input of IF converter 120. IF converter 120 also receives a reference frequency signal from computer 72 over line 132. As should be understood by those skilled in the art, IF converter 120 operates to convert the carrier frequency of the downstream signal to an intermediate frequency. For example, downstream signal may be in the frequency range of 200–450 MHz and the intermediate frequency signal may be 45 MHz. It should be understood that IF converter 120 may therefore comprise a local oscillator or a frequency synthesizer which use the frequency reference. Synthesizers placed in a particular handset module would serve similar functions to synthesizers placed external to a handset module in the core circuit 32. The primary difference would be that synthesizers placed in module 36 and particularly placed in downstream block translator 80 and upstream block translator 82 would allow for remote cell splitting. Nevertheless, local oscillators could be used as well in the alternative.

The output of bandlimiting IF converter 120 is coupled to the input of IF amplifier 122. Signal processor 70 operates as an automatic gain control and provides a corresponding gain control signal over conductor 136 which in turn operates to control the gain of IF amplifier 122. This gain control may be utilized to accommodate the unique requirements of a particular handset type or may simply be utilized in a more conventional manner to control the signal magnitude in the IF stage of downstream block frequency translator 80.

PCS frequency converter 126 receives the output of amplifier 122 and operates as should be understood by those skilled in the art to block convert the IF frequency signal to a frequency corresponding to the particular handset type being employed. This conversion occurs under control of computer 72 through conductor 138. The computer determines the synthesizer output frequency used in the conversion process. As well known to those skilled in the art, the synthesizers need access to the frequency reference 705 to operate.

The output of PSC converter 126 is coupled to the input of output amplifier of 128. In those instances in which a handset type employed with a particular handset module 36 is of the TDD type, a squelch control signal from computer 72 may be communicated over conductor 140 to amplifier 128 and thereby selectively time the operation of amplifier 128 consistent with the particular modulation needs of the corresponding handset type. This control line may alternatively be used to control transmit output power. The output of amplifier 128 is communicated over line 142 to an element represented by 84a, 84b, and 84c of FIG. 2. These elements will typically be either switches (for time division duplex handsets), or diplexers (for frequency division duplex handsets). However, handset specific antenna diversity, which combines antennas to control antenna coverage, may demand more complex circuit.

Figure 6:
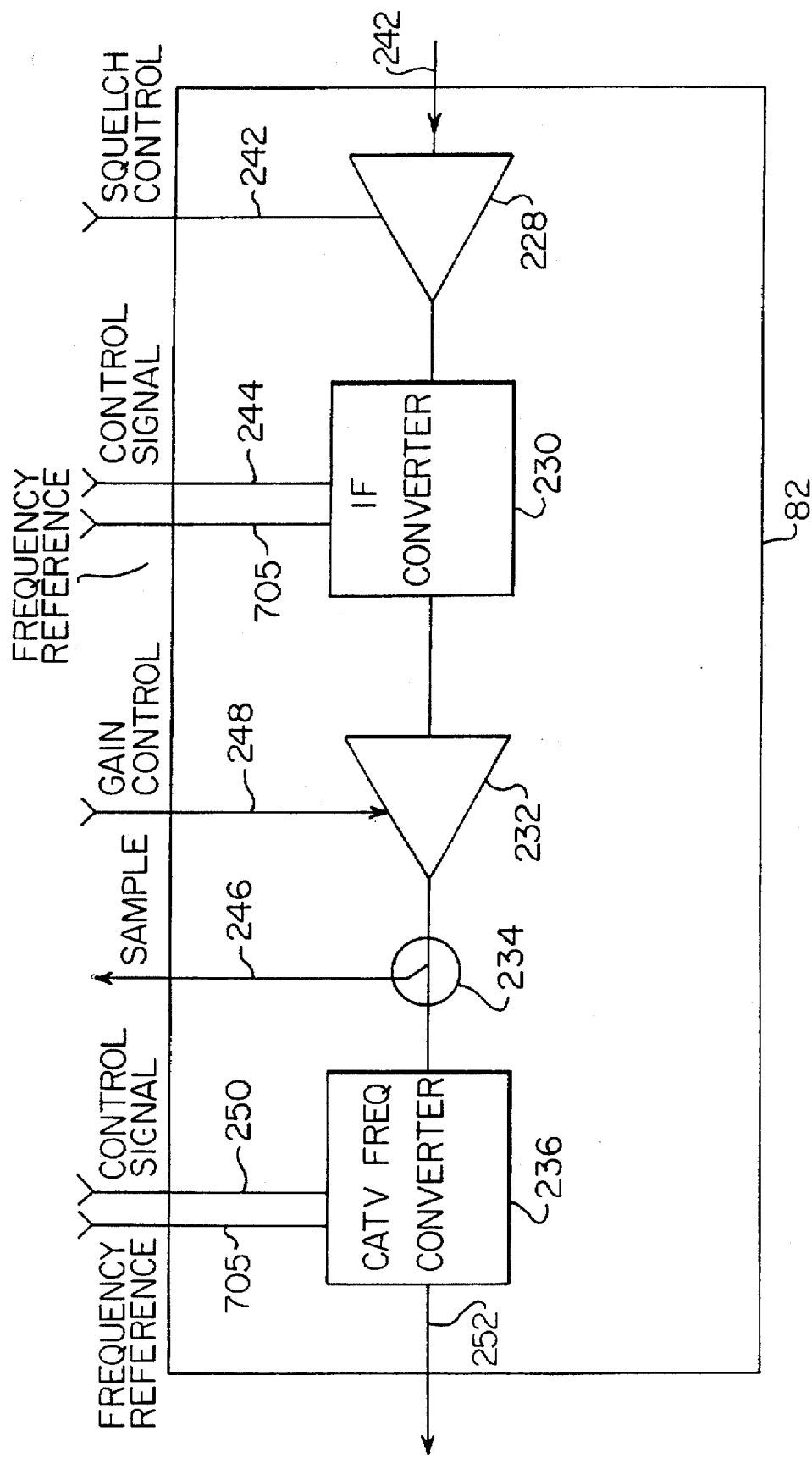
FIG. 6 is a block diagram of an upstream block frequency translator of FIG. 2.

A preferred embodiment of an upstream block translator 82 is illustrated in FIG. 6 as comprising an input amplifier 228, an IF converter 230, an IF amplifier 232, a coupler 234 and a CATV frequency converter 236. An input signal from an element 84a, 84b, 84c is coupled through conductor 242 to the input of amplifier of 228. A squelch control signal from computer 72 is provided over conductor 242 to selectively control the operation of amplifier of 228. This squelch control signal may, for example, be utilized to properly handle a time division duplex (TDD) signal received from a particular handset type. The output of amplifier 228 is coupled to the input of a bandlimiting IF converter 230. Converter 230 is operated under the control of computer 72 by having computer 72 provide a control signal over conductor 244 from core circuit 34. Similar to the downstream frequency converter, synthesizers or local oscillators may be used with the frequency reference. As should be appreciated to those skilled in the art, IF converter 230 operates to convert the received RF signal from the corresponding handset type to an intermediate frequency such as 45 MHz. The output of IF converter 230 is coupled to the input of IF amplifier 232 the output of which is sampled by coupler 234. The sampled output from coupler 234 is communicated by conductor 246 to computer 72 and may be utilized to control the gain of amplifier 232. This gain control function is typical of a module that handles a single time division multiple access (TDMA) carrier. Modules using frequency division multiple access (FDMA) carrier may or may not have the gain control function. The corresponding gain control signal is supplied by computer 72 over conductor 248. The output of amplifier 248 is coupled to the input of CATV frequency converter 236 which is operated under the control of a reference frequency signal from computer 72 over conductor 250 as should be appreciated by those skilled in the art. The output of converter 236 is typically in the upstream frequency range of 5–30 MHz and is communicated over conductor 252 through contact set 42 to signal combiner 74 of core circuit 34.

Figure 7:
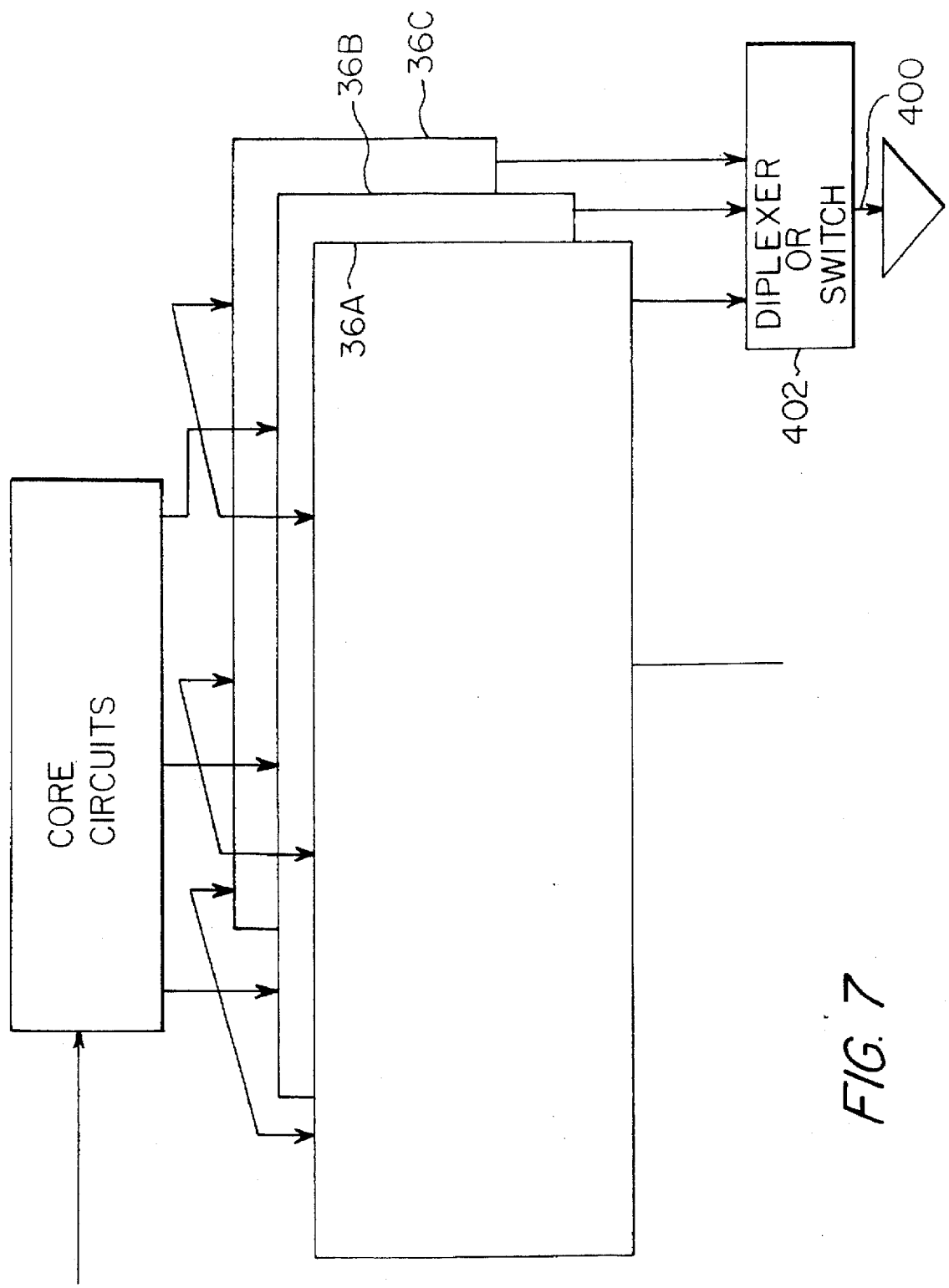
FIG. 7 is a block diagram of a plurality of handset modules using a common antenna.

In an alternative embodiment as shown in FIG. 7 modules 36a, 36b and 36c may use a common antenna 400 coupled through a switch or diplexer 402. Switch 402 may be controlled by computer 72.

In another alternative embodiment, synthesizers may be incorporated in the core circuit 34 to replace one or more local oscillators in the handset modules. These synthesizers can be controlled to change frequency to support different modules and also can be useful for remote cell splitting operations. The synthesizers can be placed in the core circuit to anticipate and support potentially different modules. However, the downside of such a configuration is that extra cost is incurred if only one module will be used in a particular area and no additional modules will be incorporated. However, if additional modules are anticipated, then having the synthesizers in the core circuit to support the potential modules may be useful and economically efficient.

As noted above, synthesizers placed in the modules can serve similar functions to local oscillators or to synthesizers supplied in the core circuit itself. The primary difference is that synthesizers supplied in the handset module would be part of the module itself and the expense of such additional synthesizers would only be incorporated in conjunction with those antenna drivers utilizing multiple handset types.

Computer 72 may preferably comprise a microprocessor which receives instruction data through the carrier signal for all the modules corresponding to the different handset types. The instruction data contains timing and control signals which include transmit and receive timing for TDD, squelch set points, operating center frequency for the CATV cable, center frequency of the handset types to match the modules and transmit power levels. The microprocessor also allows, in conjunction with a base station, modules status monitoring to monitor any failure of the modules and testing of the modules to determine whether the modules and the driver are functioning correctly. Circuits may be provided in the core circuit 34 to pass this data back, over the upstream path, to a central site. Furthermore, through the level detector of the carrier signal, the microprocessor can control signals to the amplifiers in the modules to compensate for signal attenuation during the propagation through the cable.

Finally, instead of the use of a switch for TDD, a diplexer for FDD can be used to send and receive signals to and from the handset for any particular module. For TDD, a module with a switch may be employed.

It will be apparent to those skilled in the art that various modifications and variations can be made in the disclosed embodiment of the present invention without departing from the spirit or scope of the invention. Thus it is intended that the present invention cover the modifications and various of this invention provided they come within the scope of the appended claims or their equivalence.

We claim:

1. A modular antenna driver for extending the area of coverage between a base station connected to a signal conduit system and a plurality of cordless handsets, said driver comprising:

a duplex circuit connectable to said signal conduit and including a circuit tuned for downstream and upstream communications with said base station over said signal conduit;

a core circuit connected to said duplex circuit and including circuitry interconnected to perform and of sufficient bandwidth to perform communication functions common to at least two different handset types;

at least one removable module selectively insertable into said driver and including circuitry interconnected to perform communication functions characteristic of one handset type in cooperation with the core circuit, wherein said at least one module may be replaced by a second module for a different, second handset type;

contacts connected to said core circuit and adapted to removably receive one of said modules; and, additional contacts connected to said core circuit and adapted to removably receive at least one additional removable module which is selectively insertable into said driver simultaneously with said first module and which includes circuitry interconnected to perform communication functions characteristic of said second handset type.

2. A modular antenna driver of claim 1 wherein said duplex circuit comprises a duplexing filter tuned to pass downstream and upstream communications signals of sufficient band width to accommodate both said one and said second handset types.

3. A modular antenna driver of claim 1 wherein said duplex circuit comprises a diplexing filter tuned to pass downstream and upstream communications signals of sufficient band width to accommodate both said one and said second handset types.

4. A modular antenna driver of claim 1 wherein in each said module includes a frequency translator circuit corresponding to the handset type of that module.

5. A modular antenna driver of claim 1 further including a single antenna and a switch control and or diplexer to selectively couple an output from each of said modules to said antenna.

6. A modular antenna driver of claim 1 wherein each module includes an antenna.

7. A modular antenna driver of claim 1 wherein said core circuit includes a filter tuned to pass instruction data received from said signal conduit and a computer with soft-ware programmed to control said one module in response to said instruction data.

8. A modular antenna driver of claim 7 wherein said computer includes software to control a plurality of different handset types and wherein said instruction data includes data to select software for the handset type modules inserted into said driver.

9. A modular antenna driver of claim 1 wherein said core circuit includes a filter tuned to pass instruction data received from said signal conduit and a computer with software programmed to control said one module in response to said instruction data.

10. A modular antenna driver of claim 9 wherein said computer includes software to control a plurality of different handset types and wherein said instruction data includes data to select software for the handset type modules inserted into said driver.

11. A modular antenna driver for extending the area of coverage between a base station connected to a signal conduit system and a plurality of cordless handsets, said driver comprising:

a duplex circuit connectable to said signal conduit and including a circuit tuned for downstream and upstream communications with said base station over said signal conduit;

a core circuit connected to said duplex circuit and including circuitry interconnected to perform and of sufficient bandwidth to perform communication functions common to at least two different handset types;

at least one removable module selectively insertable into said driver and including circuitry interconnected to perform communication functions characteristic of one handset type in cooperation with the core circuit, wherein said at least one module may be replaced by a second module for a different, second handset type; and, contacts connected to said core circuit and adapted to removably receive one of said modules, wherein in each said module includes a frequency translator circuit corresponding to the handset type of that module.

\* \* \* \* \*

UNITED STATES PATENT AND TRADEMARK OFFICE
CERTIFICATE OF CORRECTION

PATENT NO. : 5,701,579
DATED : December 23, 1997
INVENTOR(S) : John M. Dolan et al.

It is certified that error appears in the above-identified patent and that said Letters Patent is hereby corrected as shown below:

At [57] Abstract, line 8, after "form" please delete --and--.

At [57] Abstract, line 13, after "module" please delete --will--.

Signed and Sealed this

Thirtieth Day of June, 1998

*Attest:*

*Attesting Officer*

BRUCE LEHMAN
*Commissioner of Patents and Trademarks*

UNITED STATES PATENT AND TRADEMARK OFFICE
CERTIFICATE OF CORRECTION

PATENT NO. : 5,701,579

DATED : December 23, 1997

INVENTOR(S) : John M. Dolan et al.

It is certified that error appears in the above-identified patent and that said Letters Patent is hereby corrected as shown below:

ON THE TITLE PAGE ,

At [73] Assignee, after "N.J." please insert --Cablevision Systems Corporation, Woodbury, N.Y.--.

Signed and Sealed this

Eighteenth Day of May, 1999

*Attest:*

Q. TODD DICKINSON

*Attesting Officer*  *Acting Commissioner of Patents and Trademarks*